United States Patent
van Schouwen

(10) Patent No.: US 12,229,292 B2
(45) Date of Patent: Feb. 18, 2025

(54) SYSTEMS AND METHODS OF VERIFYING INFORMATION COMPLETENESS

(71) Applicant: Bloom Protocol, LLC, Bronx, NY (US)

(72) Inventor: Dustin van Schouwen, Portsmouth, NH (US)

(*) Notice: Subject to any disclaimer, the term of this patent is extended or adjusted under 35 U.S.C. 154(b) by 376 days.

(21) Appl. No.: 17/649,337

(22) Filed: Jan. 28, 2022

(65) Prior Publication Data
US 2023/0244803 A1 Aug. 3, 2023

(51) Int. Cl.
| | |
|---|---|
| *G06F 21/62* | (2013.01) |
| *G06F 16/23* | (2019.01) |
| *G06F 16/2455* | (2019.01) |
| *G06F 21/60* | (2013.01) |
| *G06F 21/64* | (2013.01) |

(52) U.S. Cl.
CPC ...... *G06F 21/6218* (2013.01); *G06F 16/2365* (2019.01); *G06F 16/24556* (2019.01); *G06F 21/602* (2013.01); *G06F 21/64* (2013.01)

(58) Field of Classification Search
None
See application file for complete search history.

(56) References Cited

U.S. PATENT DOCUMENTS

| | | |
|---|---|---|
| 7,076,558 B1 | 7/2006 | Dunn |
| 7,281,020 B2 | 10/2007 | Fine |
| 7,962,750 B1 | 6/2011 | Gruse |
| 7,966,647 B1 | 6/2011 | Igoe |
| 8,781,923 B2 | 7/2014 | Pitroda |
| 9,159,084 B2 | 10/2015 | Magpayo |
| 9,710,852 B1 | 7/2017 | Olson et al. |
| 10,387,980 B1 * | 8/2019 | Shahidzadeh ........ G06Q 40/123 |
| 11,250,142 B1 * | 2/2022 | Wu ........................ H04L 9/0819 |
| 2002/0046163 A1 | 4/2002 | Shahidi |
| 2003/0220817 A1 | 11/2003 | Larsen |
| 2004/0039601 A1 | 2/2004 | Anderson |
| 2004/0098366 A1 | 5/2004 | Sinclair |
| 2005/0160062 A1 | 7/2005 | Howard |

(Continued)

FOREIGN PATENT DOCUMENTS

| | | | |
|---|---|---|---|
| WO | 2009016327 A2 | 2/2009 | |
| WO | WO-2011025400 A1 * | 3/2011 | ....... G06F 17/30707 |

*Primary Examiner* — Kaveh Abrishamkar
(74) *Attorney, Agent, or Firm* — Law Office of Jenna F. Karadbil, P.C.; Juan P. Rodriguez

(57) ABSTRACT

Systems and methods for verification of information completeness are disclosed. They include a processor; a network; a network communication device; and a data store positioned in communication with the processor. The data store contains instructions that announce an association between a subject and an aggregator; record the association between the subject and the aggregator; submit a permission to allow a reporter to submit information regarding the subject to the aggregator; notify to the reporter of the permission; verify the permission granted to the reporter; submit the metadata to a datum of information to the aggregator by the reporter; submit the same datum of information to the subject by the reporter; provide a first aggregated report of all metadata tied to the datums from the aggregator; and provide a second aggregated report containing all the metadata and the datums associated with the first aggregated report.

17 Claims, 9 Drawing Sheets

(56) References Cited

U.S. PATENT DOCUMENTS

| | | |
|---|---|---|
| 2006/0289648 A1 | 12/2006 | Shafer |
| 2007/0053513 A1 | 3/2007 | Hoffberg |
| 2009/0210423 A1 | 8/2009 | Valz |
| 2013/0080203 A1 | 3/2013 | Coley |
| 2014/0201007 A1 | 7/2014 | Stack et al. |
| 2016/0117779 A1* | 4/2016 | Sale .................... G06F 16/2308 705/4 |
| 2017/0232300 A1 | 8/2017 | Tran |
| 2018/0060496 A1 | 3/2018 | Bulleit et al. |
| 2018/0150647 A1* | 5/2018 | Naqvi .................... H04L 9/321 |
| 2019/0267119 A1 | 8/2019 | Witchey |

* cited by examiner

SYSTEMS AND METHODS OF VERIFYING INFORMATION COMPLETENESS

CROSS-REFERENCE TO RELATED APPLICATIONS

The present application claims priority under 35 U.S.C. § 119(e) of U.S. Provisional Patent Application Ser. No. 69/199,867 filed on Jan. 29, 2021 and titled SYSTEMS AND METHODS FOR TRUSTLESS AGGREGATION AND VERIFICATION OF INFORMATION COMPLETENESS OVER PEER-TO-PEER (P2P) COMMUNICATION, the contents of which are incorporated herein by reference in their entirety.

FIELD OF THE DISCLOSURE

The present disclosure relates to systems and methods for verifying information completeness through peer-to-peer communication.

BACKGROUND

There are currently many systems that allow for the aggregation of information associated with one party (whether an individual, business, institution, etc.). Many of these systems are still centralized in nature, lacking many features surrounding the anonymity of the parties involves, the security or validity of the information collected, or the functionality of the system across multiple and disparate networks and computer systems.

One main, but not exclusive, set of examples includes modern data aggregation for credit bureaus and credit reports. Many such systems are centrally tied to various credit reporting institutions and fail to collect data without significant collection of tangential and unnecessary personal information tied to the parties providing the data for aggregation. All this additional data accounts for countless additional storage and computer processing costs for the parties involved. Many current systems also fail to integrate verification and validation protocols along with the aggregation of data. This leads to additional time and effort in order to account for errors and omissions when reports associated with the aggregated data are collected.

This background information is provided to reveal information believed by the applicant to be of possible relevance to the present invention. No admission is necessarily intended, nor should be construed, that any of the preceding information constitutes prior art against the present invention.

SUMMARY

One aspect of the present disclosure relates to a verification of information completeness system. The system may include at least one processor; a network; a network communication device; and a data store positioned in communication with the at least one processor, the network communication device, and the network. The data store may contain instructions that, when executed by the at least one processor, cause the system to: announce, through the network, an association between a subject and at least one aggregator; record, through the data store, the association between the subject and the at least one aggregator; submit, through the network, a permission to allow a reporter to submit information regarding the subject to the at least one aggregator; notify, through the network, to the reporter of the permission; verify, on the at least one processor, the permission granted to the reporter; submit, through the network, the metadata to a datum of information to the aggregator by the reporter; submit, through the network, the same datum of information to the subject by the reporter; provide, through the network, a first aggregated report of all metadata tied to the datums of information from the at least one aggregator to the subject; and provide, through the network, a second aggregated report containing all the metadata and the datums of information associated with the first aggregated report from the subject to a verifier of the information on the first and second aggregated reports.

In some implementations of the system, the processor may be further configured to revoke the permission between the subject and the reporter.

In some implementations of the system, the processor may be further configured to show to a reporter the revocability of the permission.

In some implementations of the system, the processor may be further configured to show to a reporter the status of a permission.

In some implementations of the system, the processor may be further configured to revoke the association between the subject and the at least one aggregator.

In some implementations of the system, the metadata tied to each datum of information includes a cryptographic signature of the datum of information.

In some implementations of the system, the metadata tied to each datum of information includes at least one tag identifying the datum to at least one associated class of data.

Another aspect of the present disclosure relates to a method of verifying information completeness. The method may include announcing an association between a subject and at least one aggregator; recording the association between the subject and the at least one aggregator; submitting a permission to allow a reporter to submit information regarding the subject to the at least one aggregator; notifying the reporter of the permission; verifying the permission granted to the reporter; submitting the metadata to a datum of information to the at least one aggregator by the reporter; submitting the same datum of information to the subject by the reporter; providing a first aggregated report of all metadata tied to the datums of information from the at least one aggregator to the subject; and providing a second aggregated report containing all the metadata and the datums of information associated with the first aggregated report from the subject to a verifier of the information on the first and second aggregated reports.

Yet another aspect of the present disclosure relates to a non-transient computer-readable storage medium having instructions embodied thereon, the instructions being executable by one or more processors to perform a method of verifying information completeness. The method may include announcing an association between a subject and at least one aggregator; recording the association between the subject and the at least one aggregator; submitting a permission to allow a reporter to submit information regarding the subject to the at least one aggregator; notifying the reporter of the permission; verifying the permission granted to the reporter; submitting the metadata to a datum of information to the at least one aggregator by the reporter; submitting the same datum of information to the subject by the reporter; providing a first aggregated report of all metadata tied to the datums of information from the at least one aggregator to the subject; and providing a second aggregated report containing all the metadata and the datums of information associated with the first aggregated report from the subject to a verifier of the information on the first and second aggregated reports.

These, and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

Figure 1:
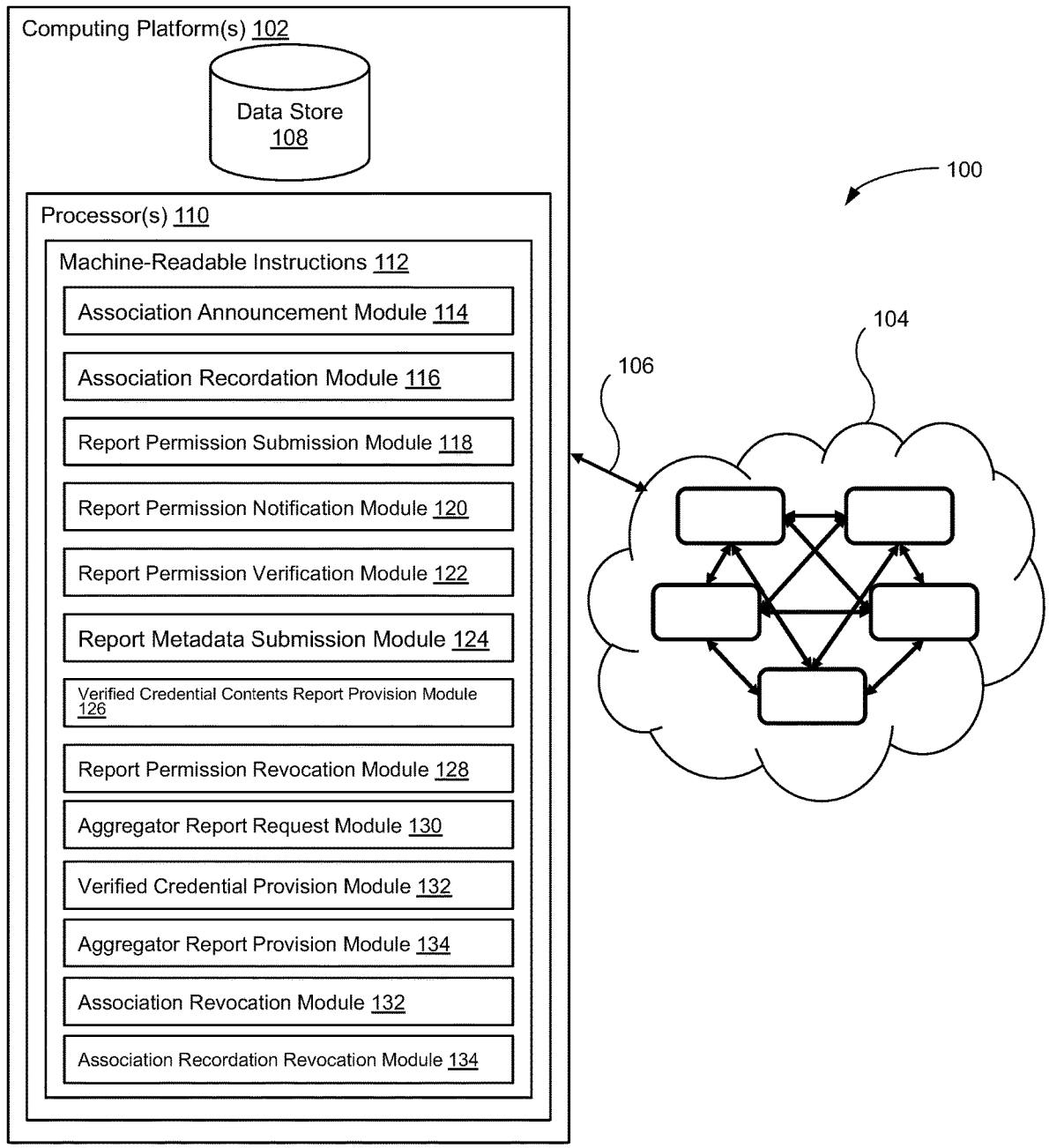
FIG. 1 illustrates an exemplary diagram of a verification of information completeness system 100, in accordance with one or more implementations.

FIG. 1 illustrates a verification of information completeness system 100, in accordance with one or more implementations. The system 100 may be used in several ways, including ensuring that both positive and derogatory data (including but not limited to credit reporting data) associated with a subject 302 is recorded by an aggregator 306 without revealing the contents of the data to aggregator 306. Additional explanation of the parties within the system 100 will be included in the description of FIG. 3 below. Additional individual use-case examples of system 100 may also include verification systems for tenant histories, financial transaction, or governmental records such as voting, immigration, or criminal records. Non-personal use-cases may also include corporate financial auditing and/or corporate records as examples. In general, any situation that would require the collection of information regarding a subject 302 held by outside third parties may benefit from the use of the system 100.

Within the system 100, completeness of the data can be guaranteed via a guarantee that data recorded for a subject 302 is sent to one or more aggregators 306 during a given period of time, by publishing associations between the subject 302 and the aggregator 306 through the network 104, which can include a decentralized ledger, such as a blockchain, or a centralized repository. In some implementations, the system 100 may including at least one computing platform(s) 102. Additional computing platform(s) 102 may be configured to communicate with the at least one other computing platform(s) 102 according to a client/server architecture, a peer-to-peer architecture, and/or other architectures.

Computing platform(s) 102 may include or be positioned in communication with a data store 108, at least one processor(s) 110, a network communication device 106 and/or other components. Computing platform(s) 102 may include communication lines or ports to enable the exchange of information with a network 104 and/or other computing platform(s) 102. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102 and may include one or more of a server, a desktop computer, a laptop computer, a handheld computer, a tablet computing platform, a smartphone, a gaming console, set-top device, internet-of-things (IoT) device, and/or other computing platforms or devices.

Computing platform(s) 102 may be configured by machine-readable instructions 112. Machine-readable instructions 112 may include one or more instruction modules. The instruction modules may include computer program modules. The instruction modules may include one or more of an association announcement module 114, an association recordation module 116, a report permission submission module 118, a report permission notification module 120, a report permission verification module 122, a report metadata submission module 124, a verified credential contents report provision module 126, a report permission revocation module 128, an aggregator report request module 130, a verified credential provision module 132, an aggregator report provision module 134, an association revocation module 136, an association recordation revocation module 138, and/or other instruction modules.

The association announcement module 114 may be configured to announce the association between a subject 302 and at least one aggregator 306 within the system 100. This announcement initiates the connection between the subject 302 and the aggregator 306 to begin the aggregation and verification of information process detailed by the system 100. The announcement may occur through the network 104 and may be distributed across multiple nodes 202 within the network 104. Examples of a system 100 that begin with this module may include general aggregators 306 that do not require any initial steps, thus beginning the aggregation process with any subject 302 at any time.

The association recordation module 116 may be configured to record the announced association between the subject 302 and the at least one aggregator 306. This record ensures a start time for the association between the subject 302 and the aggregator 306 to ensure the validity of the collected verified credentials within the reports generated by the aggregator 306. The recording of these associations may be held within multiple instances of the ledger 206 across the network 104 to ensure that these associations remain recorded and immutable. Other versions of the system 100 may trigger this module first when an aggregator 306 may require an initial confirmation step prior to triggering the association with the subject 302. The association recordation module 116 may be triggered before the association announcement module 114 or vice versa, depending on the relationship between the subject 302 and the at least one aggregator 306.

The report permission submission module 118 may be configured to submit a report permission into the system 100. This report permission allows any of at least one reporter 308 to submit reports for the subject 302 to the aggregator 306. Each report permission may contain a timestamp along with the reporter's 302 and aggregator's 306 addresses associated with the system 100 to ensure the proper transfer of reports. These identifying elements may be modified to account for additional security requirements to account for additional identifiers between the parties. Without the report permission, reporters 308 would not be allowed to submit reports to the aggregator 306, thus leaving the aggregator 306 with no information as the basis for the aggregated (and later verified) report. The data recorded by the aggregator is stored in the form of cryptographic hashes of privacy-sensitive aspects of the data, coupled together with information mapping the data to the subject 302 and arbitrary strings of text ("tags") describing the nature of the data in non-specific/abstract terms.

The report permission notification module 120 may be configured to notify a reporter 308 of the report permission, thus allowing the reporter 308 to initiate the submission of information to the aggregator 306. Alternate embodiments may omit notifications based on the relationships between the parties or the additional steps prior to triggering the report permission submission module 118 above.

The report permission verification module 122 may be configured to verify the report permission with the aggregator 306. This verification ensures that the subject 302 has granted the appropriate permission to the reporter 308 to begin sending reports within the system 100.

The report metadata submission module 124 may be configured to allow the reporter 308 to submit report metadata (associated with the subject 302) to the aggregator 306 in the form of a verified credential. In one implementation of the system 100, all verified credentials described conform to the W3C Verifiable Credentials Working Group specification, at any iteration of said specification.

Furthermore, the data recorded by the aggregator 306 may also be stored in the form of cryptographic hashes of privacy-sensitive aspects of the data, coupled together with information mapping the data to the subject 302 and arbitrary strings of text ("tags") describing the nature of the data in non-specific/abstract terms. Either verified credentials or cryptographic hashes of those verified credential may be presented within the system 100. Also the term "verified credential" is not limited to the standard stated above as any comparable form of machine-readable data may be used.

The verified credential contents report provision module 126 may be configured to allow a reporter 308 to provide reports with the full verified credential contents to the subject 302. This gives the subject 302 access to the data connected with what will be found within the report generated by the aggregator 306.

The report permission revocation module 128 may be configured to revoke the report permission between the subject 302 and the aggregator 306. This revocation prevents the aggregator 306 from collecting any additional information from any reporter(s) 308. If the aggregation report created by the aggregator 306 is requested, it will only contain those verified credentials submitted by reporter(s) 308 up to the point of this revocation. Any attempt to re-establish the association performed by the association announcement module 114 will establish a new report between the subject 302 and the aggregator 306.

The aggregator report request module 130 may be configured to allow the subject 302 to request the report generated by the aggregator 306. The aggregator report should contain all the aggregated information collected through the permissions granted in the prior modules during the given period. All records recorded by the system 100 may include a unique identifier, timestamps for creation and time of last update between reports by the reporter(s) 308, as well as digital/cryptographic signatures and associated plaintexts (the data that is signed) for any actions unique to the database record in question (including, but not limited to, "reporting", "creation", "permission", and/or "revocation").

The verified credential provision module 132 may be configured to provide the verified credentials associated with the aggregator report to the subject 302.

The aggregator report provision module 134 may be configured to allow the subject 302 to provide the aggregator report along with the associated metadata content to any of the verifier(s) 310 tied to the system 100. These verifier(s) 310 then confirm the contents of the metadata associated with the verified credentials to attest to the completeness of the information within the report. This is done separately to isolate the separate functions of the aggregator(s) 306, reporter(s) 308, and verifier(s) 310. This functionality may also be done in conjunction with the verified credential contents report provision module 126 in some implementations of the system 100.

The association revocation module 136 may be configured to revoke the associated between the subject 302 and aggregator 306. This revocation may occur through the network 104 and may be distributed across multiple nodes 202 within the network 104.

The association recordation revocation module 138 may be configured to record the revocation of the association between the subject 302 and the aggregator 306. This final record may be later used to ensure the end of the permissions granted to the aggregator(s) 306 on behalf of subject 302. In some implementations the revocation may occur through the association revocation module 136 without use of the association recordation module 138 to ensure additional anonymity between the subject 302 and the aggregator 306.

In some implementations of the system 100, the metadata tied to each datum of information includes a cryptographic signature of the datums of information. In some implementations, this cryptographic signature may include a private key of the communicating party.

The data store 108 may comprise non-transitory storage media that electronically stores information. The electronic storage media of data store 108 may include one or both of system storage that is provided integrally (i.e., substantially non-removable) with computing platform(s) 102 and/or removable storage that is removably connectable to computing platform(s) 102 via, for example, a port (e.g., a USB port, a firewire port) or a drive (e.g., a hard-disk drive). Data store 108 may include one or more of optically readable storage media (e.g., CD-ROM, DVD), magnetically readable storage media (e.g., magnetic tape, magnetic hard drive, floppy drive), electrical charge-based storage media (e.g., EEPROM, RAM), solid-state storage media (e.g., flash drive, solid-state hard drive), and/or other electronically readable storage media. Data store 108 may include one or more virtual storage resources (e.g., cloud storage, a virtual private network, and/or other virtual storage resources). Data store 108 may store software algorithms, information determined by processor(s) 110, information received from computing platform(s) 102, information received from the network 104, and/or other information that enables computing platform(s) 102 to function as described herein.

Processor(s) 110 may be configured to provide information processing capabilities in computing platform(s) 102. As such, processor(s) 110 may include one or more of a digital processor, an analog processor, a digital circuit designed to process information, an analog circuit designed to process information, a state machine, and/or other mechanisms for electronically processing information. Although processor(s) 110 is shown in FIG. 1 as a single entity, this is for illustrative purposes only. In some implementations, processor(s) 110 may include a plurality of processing units. These processing units may be physically located within the same device, or processor(s) 110 may represent processing functionality of a plurality of devices operating in coordination. Processor(s) 110 may be configured to execute modules 114, 116, 118, 120, 122, 124, 126, 128, 130, 132, 134, 136, 138, and/or other modules. Processor(s) 110 may be configured to execute modules 114, 116, 118, 120, 122, 124, 126, 128, 130, 132, 134, 136, 138, and/or other modules by software; hardware; firmware; some combination of software, hardware, and/or firmware; and/or other mechanisms for configuring processing capabilities on processor(s) 110. As used herein, the term "module" may refer to any component or set of components that perform the functionality attributed to the module. This may include one or more physical processors during execution of processor readable instructions, circuitry, hardware, storage media, or any other components.

It should be appreciated that although modules 114, 116, 118, 120, 122, 124, 126, 128, 130, 132, 134, 136, and/or 138 are illustrated in FIG. 1 as being implemented within a single processing unit, in implementations in which processor(s) 110 includes multiple processing units, one or more of modules 114, 116, 118, 120, 122, 124, 126, 128, 130, 132, 134, 136, and/or 138 may be implemented remotely from any other modules. The description of the functionality provided by the different modules 114, 116, 118, 120, 122, 124, 126, 128, 130, 132, 134, 136, and/or 138 described below is for illustrative purposes, and is not intended to be limiting, as any of modules 114, 116, 118, 120, 122, 124, 126, 128, 130, 132, 134, 136, and/or 138 may provide more or less functionality than is described. For example, one or more of modules 114, 116, 118, 120, 122, 124, 126, 128, 130, 132, 134, 136, and/or 138 may be eliminated, and some or all of its functionality may be provided by other modules of modules 114, 116, 118, 120, 122, 124, 126, 128, 130, 132, 134, 136, and/or 138. As another example, processor(s) 110 may be configured to execute one or more additional modules that may perform some or all of the functionality attributed below to one of modules 114, 116, 118, 120, 122, 124, 126, 128, 130, 132, 134, 136, and/or 138.

In some implementations, the computing platform(s) 102 may be operatively linked via one or more electronic communication links. For example, such electronic communication links may be established, at least in part, via a network 104, which is some cases may be a decentralized ledger network 104. The network 104 may include the Internet and/or other networks. It will be appreciated that this is not intended to be limiting, and that the scope of this disclosure includes implementations in which computing platform(s) 102 and the network 104 may be operatively linked via some other communication system, media, or protocol.

Figure 2:
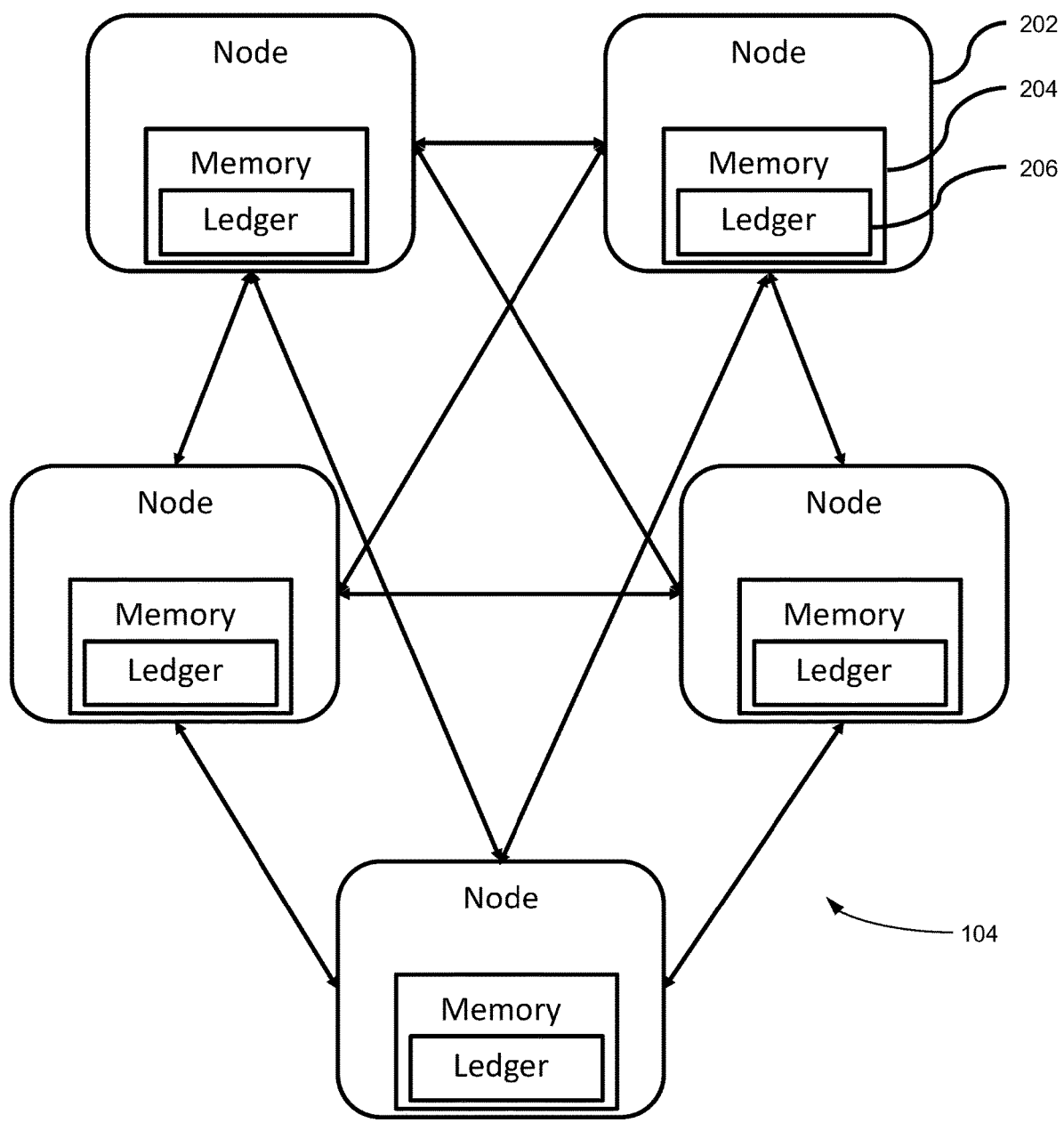
FIG. 2 illustrates an exemplary diagram of a decentralized ledger network 104 found within the system 100, in accordance with one or more implementations.

FIG. 2 illustrates an exemplary diagram of a network 104 as a decentralized ledger network found within the system 100, in accordance with one or more implementations. The network 104 may include a plurality of nodes 202, each node 202 in communication with at least one other node 202 within the network. Node(s) 202 may include computing platform(s) 102 but can also include any device capable of storing information and communicating over the network 104.

Each node 202 may further include a memory 204 that further stores all or a portion of a public ledger 206. The public ledger 206 may be utilized in order to store all or a portion of the machine-readable instructions 112 tied to the system 100. By way of example, the public ledger 206 may be used to store the blockchain smart contract 304 utilized within system 100, protocol 300, and method 400. The memory may consist of a data store 108 and may comprise non-transitory storage media that electronically stores information as discussed within this disclosure. By way of example, the network 104 may be a network tied to any public or private blockchain network or networks in connection with any of a plurality of cryptocurrencies described within this disclosure.

Figure 3:
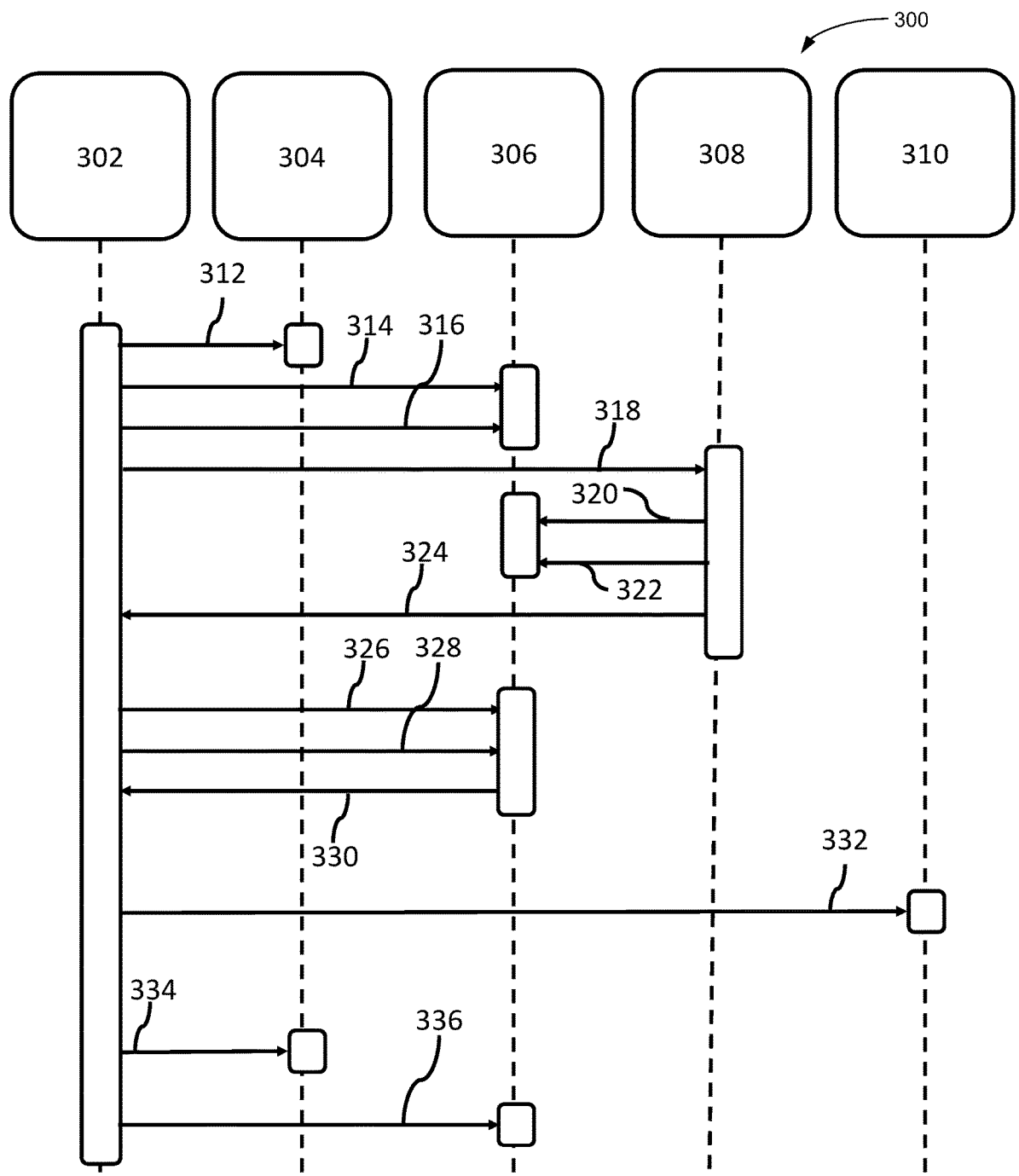
FIG. 3 illustrates an exemplary data flow diagram of the protocol 300 tied to the system 100, in accordance with one or more implementations.

FIG. 3 illustrates an exemplary data flow diagram of the protocol 300 within the system 100, in accordance with one or more implementations.

The protocol 300 may include any of the parties that operate within the system 100. These parties include subject(s) 302, aggregator(s) 306, reporter(s) 308, and/or verifier(s) 310. Each of these parties communicate directly or indirectly with blockchain smart contract 304 contained within the memory 204 of network 104. The blockchain smart contract 304 may include any machine-readable instruction 112 that allows for the operation of functions on the network 104 and retained, either in whole or in part, within the ledger 206 of any memory 204. Any one of the parties may operate through a computing platform(s) 102 or any other resource in communication with the network 104.

A subject 302 may be any party that wishes to have associated information collected and verified over a reporting period. By way of example, a subject 302 may be a consumer that wishes to have verified personal information collected by a service (an aggregator 306) for later transmission to a third party through the system 100. An aggregator 306 may be any party or service that receives information for the subject 302. The aggregator 306 may or may not have access to the data it receives associated to the subject 302. An aggregator 306 may also be one or multiple aggregators working collectively or separately. A reporter 308 is any party (whether an individual, service, or institution) that wishes to report information associated to a subject 302. There may be one or more reporter(s) 310 participating within a given protocol 300 to use the system 100 and provide information regarding a subject 302. Finally, verifier(s) 310 may be any third party that may receive information generated by the aggregator 306 from the subject 302. Alternate embodiments of the system 100 and protocol 300 may allow for the subject 302, aggregator(s) 306, reporter(s) 308, and verifier(s) 310 roles to be performed by the same parties, multiple combination(s), or instances of parties as based on the nature of the information. The term party or parties may constitute human-directed or automated computing platform(s) 102 or other system(s) depending on the implementation.

The following operations give an exemplary representation of the data flow of protocol 300 through the system 100 as explained in this disclosure.

Initially, at operation 312, a subject 302 announces an association with an aggregator 306 through the association announcement module 114 and the blockchain smart contract 304. Prior to this, the subject 302 assigns a unique identifier to maintain anonymity. One example of a unique identifier may be a cryptographic public-private key pair. The assignment of the unique identifier may be prompted by the subject 302 or can be part of operation 312.

At operation 314, the subject 304 records the association with the aggregator 306 through the association recordation module 116.

At operation 316, the subject 304 submits a report permission to allow the reporter 308 to submit reports to the aggregator 306 through the report permission submission module 118.

At operation 318, the subject 304 notifies a reporter 308 of the submitted report permission. This allows the reporter 308 to submit reports of information to the aggregator 306 through the report permission notification module 120.

At operation 320, a reporter 308 verifies the report permission with the aggregator 306 through the report permission verification module 122.

At operation 322, the reporter 308 submits report metadata to the aggregator 306 in the form of a verified credential through the report metadata submission module 124.

At operation 324, the reporter 308 provides a report with the full verified credential contents to the subject 302 through the verified credential contents report provision module 126.

At operation 326, the subject 302 may revoke the report permission with the aggregator 306 through the report permission revocation module 128. This effectively stops the aggregator 306 from receiving additional data from any reporter 308.

At operation 328, the subject 302 may request the aggregator report from the aggregator 306 through the aggregator report request module 130.

At operation 330, the aggregator 306 provides the verified credential to the subject 302 through the verified credential provision module 132.

At operation 332, the subject 302 provides the aggregator report along with all associated verified credential content to the verifier 310 through aggregator report provision module 134.

At operation 334, the subject may revoke the association with the aggregator 306 through the association revocation module 136 and/or the blockchain smart contract 304.

At operation 336, the subject 302 may revoke the recorded association with the aggregator 306 through the association recordation revocation module 138.

FIGS. 4A, 4B, 4C, 4D, 4E and/or 4F illustrate a method 400 of transmitting and verifying peer to peer-based messages, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIGS. 4A, 4B, 4C, 4D, 4E and/or 4F and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

Figure 4A:
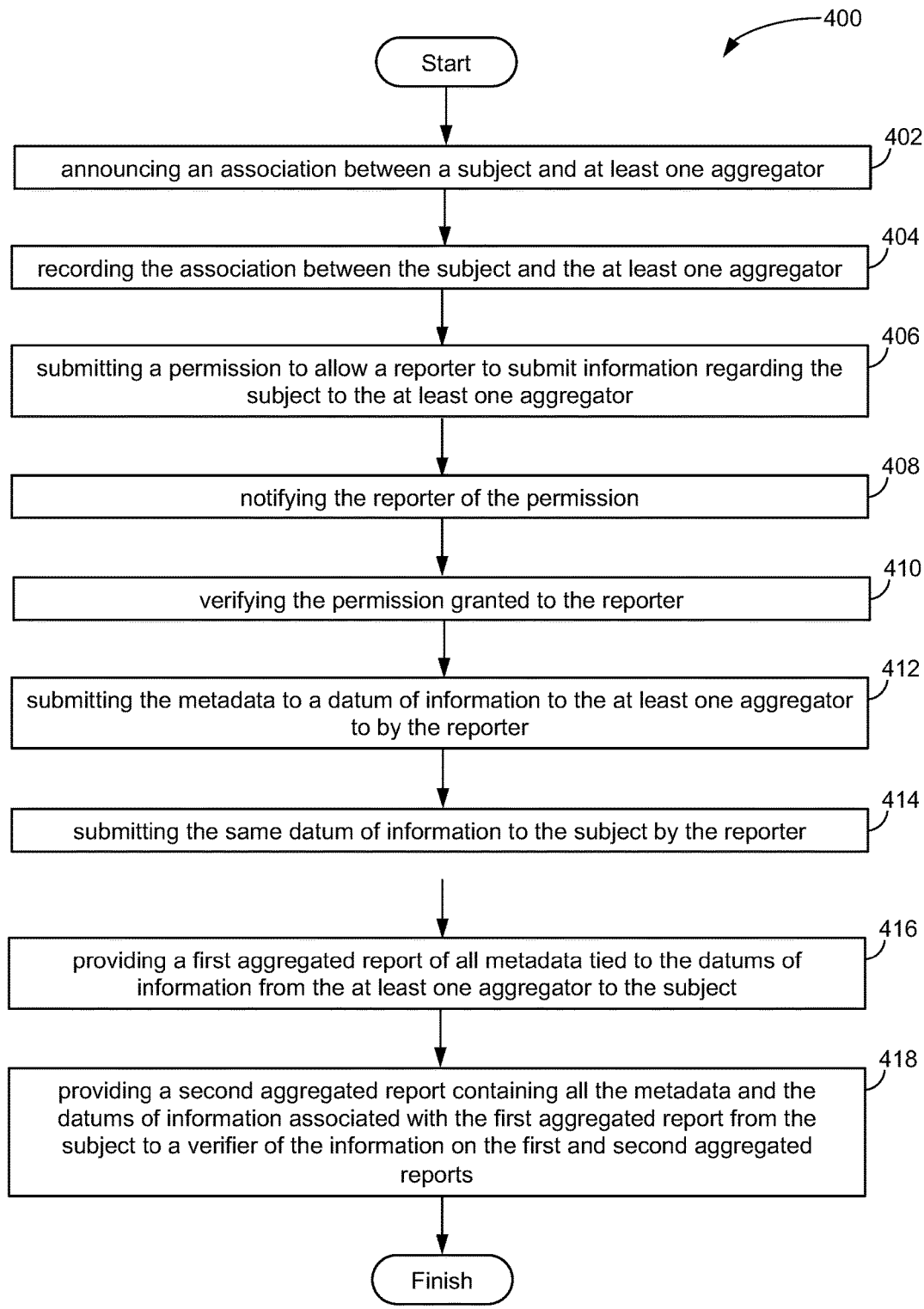
FIGS. 4A, 4B, 4C, 4D, 4E and/or 4F illustrates an exemplary method 400 of verifying information completeness, in accordance with one or more implementations.

FIG. 4A illustrates method 400, in accordance with one or more implementations.

At step 402, method 400 may include announcing an association between a subject 302 and at least one aggregator 306.

At step 404, method 400 may also include recording the association between the subject 302 and the at least one aggregator 306.

At step 406, method 400 may also include submitting a permission to allow a reporter 308 to submit information regarding the subject 302 to the at least one aggregator 308.

At step 408, method 400 may also include notifying the reporter 308 of the permission. Once the reporter 308 receives the notification to submit information they may begin submitting any information they have regarding the subject 302 to the aggregator 306.

At step 410, method 400 may also include verifying the permission granted to the reporter 308.

At step 412, method 400 may also include submitting the metadata to a datum of information to the at least one aggregator 306.

At step 414, method 400 may also include submitting the metadata to the same datum of information to the subject 302 by the reporter 308.

At step 416, method 400 may also include providing a first aggregated report of all metadata tied to the datums of information from the at least one aggregator 306 to the subject 302.

At step 418, method 400 may also include providing a second aggregated report containing all the metadata and the datums of information associated with the first aggregated report from the subject 302 to a verifier 310 of the information on the first and second aggregated reports.

Figure 4B:
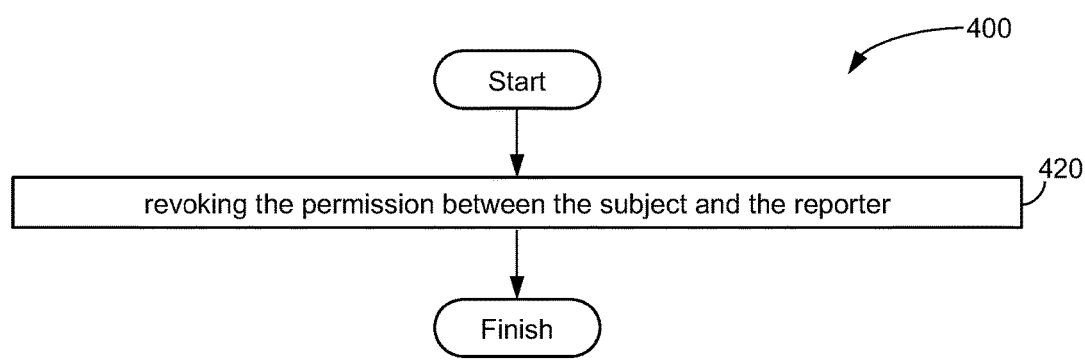

FIG. 4B illustrates step 420, in accordance with one or more of the implementations. At step 420, method 400 may include revoking the permission between the subject 302 and the reporter 308.

Figure 4C:
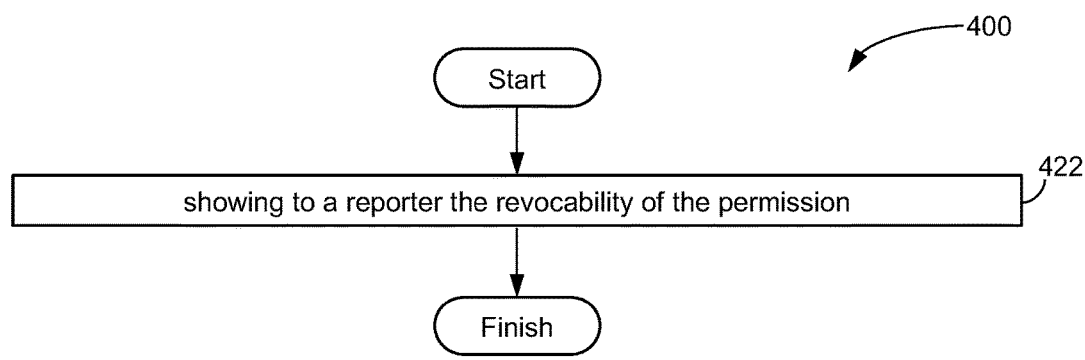

FIG. 4C illustrates step 422, in accordance with one or more of the implementations. At step 422, method 400 may include showing to a reporter 302 the revocability of the permission.

Figure 4D:
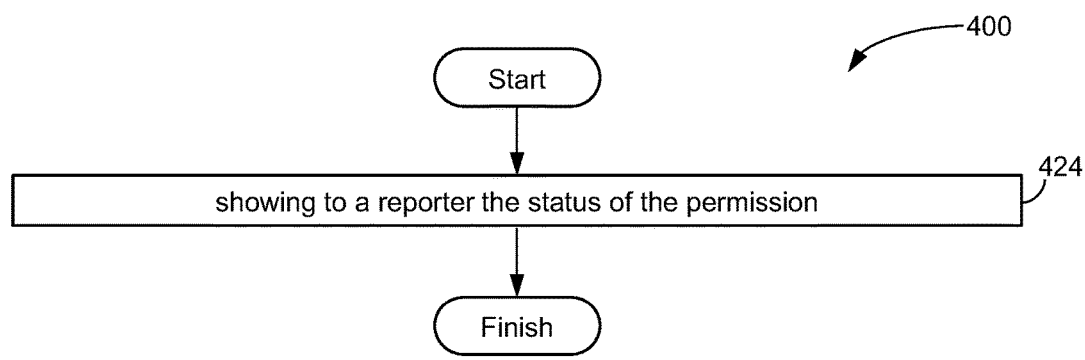

FIG. 4D illustrates step 424, in accordance with one or more of the implementations. At step 424, method 400 may include showing a reporter 302 the status of the permission.

Figure 4E:
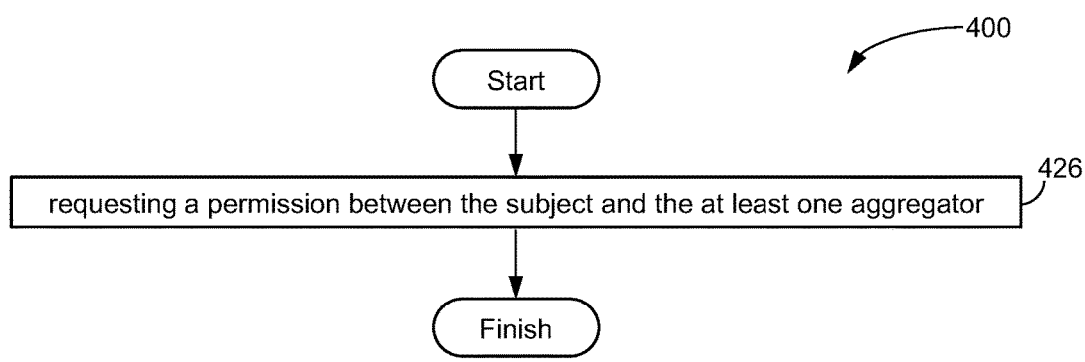

FIG. 4E illustrates step 426, in accordance with one or more of the implementations. At step 426, method 400 may include requesting an association between the subject 302 and the at least one aggregator 306.

Figure 4F:
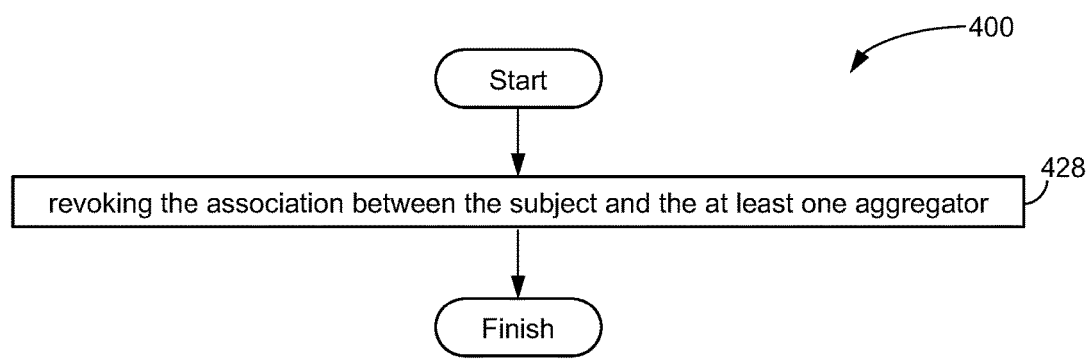

FIG. 4F illustrates step 428, in accordance with one or more of the implementations. At step 428, method 400 may include revoking the association between the subject 302 and the at least one aggregator 306.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium or data store may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: portable computer diskette, hard disk, read only memory (ROM), optically readable storage media (e.g., CD-ROM, DVD), magnetically readable storage media (e.g., magnetic tape, magnetic hard drive, floppy drive), electrical charge-based storage media or random access memory (e.g., EEPROM, RAM), solid-state storage media (e.g., flash drive, solid-state hard drive), other electronically readable storage media and/or any suitable combination of the foregoing. In the context of this disclosure, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, and/or any suitable combination of the foregoing.

Computer program code for carrying out operations for aspects of the present invention may be written in any combination of one or more programming languages, including: object oriented programming languages such as Java, Smalltalk, C++, conventional procedural programming languages such as the "C" programming language or similar programming languages, scripting language such as Perl, Javascript/Typescript, and/or VBS, functional languages such as Lisp and/or ML, logic-oriented languages such as Prolog, and/or blockchain smart contract languages such as Solidity, Move, Tezos, fi, and/or Plutus. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a virtual private network (VPN), and/or a wide area network (WAN), or the connection may be made to an external computer (for example, through the Internet using an Internet Service Provider). Any blockchain within this disclosure may be a cryptocurrency-based blockchain tied to any known cryptocurrency such as Ethereum, Ethereum Classic, Bitcoin, Litecoin, Solana, or any such currency based on a proof of work or proof of stake blockchain or a private blockchain based on frameworks such as Hyperledger Fabric and its variants, Multichain, R3 Corda, and/or Openblockchain.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or device provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instruction embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively or may include one or more stand-alone components. The hardware and software components of the computer system of the present disclosure may include and may be included within fixed and portable devices such as desktops, laptops, and/or servers. A module may be a component of a device, software, program, or system that implements some "functionality," which can be embodied as software, hardware, firmware, and/or electronic circuitry.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

Furthermore, although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A verification of information completeness system comprising:
    at least one processor;
    a network;
    a network communication device; and
    a data store positioned in communication with the at least one processor, the network communication device, and the network, the data store containing instructions that, when executed by the at least one processor, cause the system to:
        announce, through the network, an association between a subject and at least one aggregator;
        record, through the data store, the association between the subject and the at least one aggregator;
        submit, through the network, a permission to allow a reporter to submit information regarding the subject to the at least one aggregator;
        notify, through the network, to the reporter of the permission;
        verify, on the at least one processor, the permission granted to the reporter;
        submit, through the network, the metadata to a datum of information to the aggregator by the reporter, the metadata tied to each datum of information including a cryptographic signature of the datum of information;
        submit, through the network, the same datum of information to the subject by the reporter;
        provide, through the network, a first aggregated report of all metadata and tied to the datums of information from the at least one aggregator to the subject, the first aggregated report including a cryptographic signature of the report; and
        provide, through the network, a second aggregated report containing all the metadata associated with the first aggregated report from the subject to a verifier of the information on the first and second aggregated reports.

2. The system of claim 1 wherein the processor is further configured to revoke the permission between the subject and the reporter.

3. The system of claim 2 wherein the processor is further configured to show to a reporter the revocability of the permission.

4. The system of claim 1 wherein the processor is further configured to show to a reporter the status of the permission.

5. The system of claim 1 wherein the processor is further configured to request a permission between the subject and the at least one aggregator.

6. The system of claim 1 wherein the processor is further configured to revoke the association between the subject and the at least one aggregator.

7. The system of claim 1 wherein the metadata tied to each datum of information includes at least one tag identifying the datum to at least one associated class of data.

8. The system of claim 1 wherein the second aggregated report includes a cryptographic signature of the report.

9. A method of verifying information completeness utilizing a system including at least one processor, a network, a network communication device, and a data store positioned in communication with the at least one processor, the network communication device, and the network, the method comprising:

announcing, through the network, an association between a subject and at least one aggregator;

recording, through the data store, the association between the subject and the at least one aggregator;

submitting, through the network, a permission to allow a reporter to submit information regarding the subject to the at least one aggregator;

notifying, through the network, the reporter of the permission;

verifying, on the at least one processor, the permission granted to the reporter;

submitting, through the network, the metadata to a datum of information to the at least one aggregator by the reporter, wherein the metadata tied to each datum of information includes a cryptographic signature of the datum of information;

submitting, through the network, the same datum of information to the subject by the reporter;

providing, through the network, a first aggregated report of all metadata and the datums of information from the at least one aggregator to the subject, the first aggregated report having a cryptographic signature; and providing, through the network, a second aggregated report containing all the metadata associated with the first aggregated report from the subject to a verifier of the information on the first and second aggregated reports.

10. The method of claim 9 further including revoking the permission between the subject and the reporter.

11. The method of claim 10 further including showing to a reporter the revocability of the permission.

12. The method of claim 9 further including showing to a reporter the status of the permission.

13. The method of claim 9 further including requesting a permission between the subject and the at least one aggregator.

14. The method of claim 9 further including revoking the association between the subject and the at least one aggregator.

15. The method of claim 9 wherein the metadata tied to each datum of information includes at least one tag identifying the datum to at least one associated class of data.

16. The method of claim 9 wherein the second aggregated report includes a cryptographic signature of the report.

17. A non-transient computer-readable storage medium having instructions embodied thereon, the instructions being executable by one or more processors to perform a method of verifying information completeness comprising:

announcing an association between a subject and at least one aggregator;

recording the association between the subject and the at least one aggregator;

submitting a permission to allow a reporter to submit information regarding the subject to the at least one aggregator;

notifying the reporter of the permission;

verifying the permission granted to the reporter;

submit, through the network, the metadata to a datum of information to the aggregator by the reporter, wherein the metadata tied to each datum of information includes a cryptographic signature of the datum of information;

submitting the same datum of information to the subject by the reporter;

providing a first aggregated report of all metadata and the datums of information from the at least one aggregator to the subject, the first aggregated report having a cryptographic signature; and providing a second aggregated report containing all the metadata associated with the first aggregated report from the subject to a verifier of the information on the first and second aggregated reports.

* * * * *